United States Patent [19]

Petersen

[11] Patent Number: 5,733,115
[45] Date of Patent: Mar. 31, 1998

[54] ROTARY DRUM SUSPENDED WITHIN LIVE-RING

[75] Inventor: Jørn Petersen, Valby, Denmark

[73] Assignee: F.L. Smidth & Co. A/S, Denmark

[21] Appl. No.: 737,024

[22] PCT Filed: May 4, 1995

[86] PCT No.: PCT/DK95/00179

§ 371 Date: Nov. 1, 1996

§ 102(e) Date: Nov. 1, 1996

[87] PCT Pub. No.: WO95/34792

PCT Pub. Date: Dec. 21, 1995

[30] Foreign Application Priority Data

Jun. 16, 1994 [DK] Denmark .................. 0704/94

[51] Int. Cl.⁶ .................................................. F27B 7/00
[52] U.S. Cl. .................. 432/103; 432/104; 34/108
[58] Field of Search ........................ 432/103, 104, 432/105; 110/246; 34/108, 110, 601

[56] References Cited

U.S. PATENT DOCUMENTS

| 2,198,820 | 4/1940 | How . | |
|---|---|---|---|
| 3,950,043 | 4/1976 | Endersen | 308/15 |
| 4,030,878 | 6/1977 | Kunath | 432/103 |
| 4,094,628 | 6/1978 | Rasmussen et al. | 432/103 |
| 4,171,949 | 10/1979 | Endersen et al. | 432/103 |
| 4,265,031 | 5/1981 | Kirchhoff | 432/103 |
| 4,344,596 | 8/1982 | Hjaeresen | 432/103 |
| 4,403,952 | 9/1983 | Birch et al. | 432/103 |

FOREIGN PATENT DOCUMENTS

| 0325189 | 7/1989 | European Pat. Off. . |
| 3145901 | 6/1983 | Germany . |
| 2849490 | 4/1984 | Germany . |
| 3320236 | 12/1984 | Germany . |
| 4312508 | 10/1994 | Germany . |

Primary Examiner—Henry A. Bennett
Assistant Examiner—Jiping Lu
Attorney, Agent, or Firm—Brumbaugh, Graves, Donohue & Raymond

[57] ABSTRACT

A description is given of a rotary drum, as for example a rotary kiln, which is suspended within a live-ring by means of axially extending brackets which are retained by the live-ring and bearing, at their free ends, against retaining elements fixed to the rotary drum, in such a way that the vertical load of the drum relative to the drum shell is transmitted tangentially to the live-ring. The brackets are evenly distributed over the circumference of the live-ring fixed to its side faces. Hereby, the live-ring can be made with a smooth cylindrical inner face without teeth, which, besides being advantageous from an economic perspective, also makes it possible to use existing live-rings of the migrating type. Further, all parts of the device will be more readily accessible in connection with inspection and maintenance work in that none of the parts are concealed under the live-ring.

10 Claims, 2 Drawing Sheets

ROTARY DRUM SUSPENDED WITHIN LIVE-RING

BACKGROUND OF THE INVENTION

The present invention relates to a rotary drum, such as a rotary kiln, which is suspended substantially concentric within a live-ring by means of, at both sides of the live-ring, axially extending brackets, preferably arranged in pairs, which are retained by the live-ring, and which at their free ends bear against the end surfaces of retaining elements fixed to the shell of the drum, in such a way that the vertical load of the drum relative to the drum shell is transmitted tangentially to the live-ring.

A rotary drum of the aforementioned kind is known for example from the EP patent specification No. 0 325 189. This known rotary drum is suspended within a live-ring which on its internal periphery is provided with teeth, and which by means of washer plates fixed between the live-ring teeth support the rotary drum via retaining elements which are fixed to the drum shell by welding. The washer plates which extend transversely to the live-ring between its teeth and axially outwards at both sides of the live-ring, are retained between the live-ring teeth with the aid of wedges.

The disadvantage of utilizing a live-ring which is internally equipped with teeth is that such a live-ring is relatively expensive to manufacture and also to repair in the event of tooth fracture. Furthermore, the above described device con not without replacement of the live-ring be used for modernization of older existing kiln plants where typically a live-ring of the so-called migrating type is being used, i.e. where the rotary drum migrates within the live-ring across its internal periphery during the rotation of the live-ring, or, in other words, where there a relative mutual rotation between the rotary drum and the live-ring occurs during operation. A further disadvantage of the known device is the inherent difficulty of inspection and maintenance in that some of the parts of the device are concealed under the live-ring, this being a complicating factor in terms of accessibility. Furthermore, the dismantling of the known device which is necessary in case of maintenance work is required is complicated by the fact that all stationary parts are fixed by welding.

SUMMARY OF THE INVENTION

It is the objective of the present invention to provide a rotary drum by means of which the aforementioned disadvantages are eliminated.

This is achieved by means of a rotary drum of the kind described in the introduction, and being characterized in that the brackets evenly distributed over the circumference of the live-ring are fixed to the side faces of the live-ring.

Hereby, the live-ring can be manufactured with a smooth cylindrical inner face without teeth, which, in addition to being advantageous from an economic viewpoint, also makes it possible to use existing live-rings of the migrating type. Also, it will be less difficult to gain access to the parts of the device during inspection and maintenance work since none of the parts are concealed under the live-ring.

To further facilitate the work in connection with the assembly and maintenance of the device it is preferred that the brackets are fixed to the live-ring by means of bolts. These bolts may be fixed in threaded holes provided in the live-ring, but, both for reasons of construction and economy, it is preferred, however, that the bolts via through-going holes in the live-ring retain brackets on both sides of the live-ring.

The device may be configured with a retaining element for each bracket. It is preferred, however, that the retaining elements are formed with two oppositely-pointing end faces which are used to support separate brackets. Hence, the end faces are alternately used to support separate brackets when, during live-ring rotation, the retaining element is moving downwards and upwards, respectively. As mentioned in the introduction, the brackets are preferably fixed in pairs and therefore, for practical reasons, the number of retaining elements should correspond to the number of the bracket pairs.

It is further preferred that the free ends of the brackets in a pair engage between the end faces of two adjoining retaining elements.

When the rotary drum is in operation, minor relative movements in the radial direction between the rotary drum and the live-ring occur due to temperature variations and different ovality. At the rotary drum according to the invention these movements are allowed to occur between the functional faces of the bracket ends and the corresponding end faces on the retaining elements. In order to reduce the maintenance costs inevitably incurred as a result of the wear thus induced, it is preferred that the rotary drum comprises slide shoes, each of which is loosely fitted in the space between the functional face of a bracket end and the corresponding end face on a retaining element. This will cause the relative movements to occur between the slide shoes and the functional face of the bracket ends. To ensure that the wear is induced on the slide shoes, which are relatively easier to replace than the brackets, it is preferred that the brackets be made from a material which is more wear-resisting than that used to make the slide shoes.

In order to equalize the wear which will invariably occur on the slide shoes and to avoid the formation of gaps between the slide shoes and the brackets, the rotary drum according to the invention may comprise wear-compensating wedges, with each wedge being fitted in the space between a slide shoe and the corresponding end face on a retaining element.

The rotary drum may also comprise tensioning means, such as springs, for tensioning the wedges.

The rotary drum may further comprise cover plates, each mounted on the top surface of a retaining element, preferably by means of bolts, and maintaining the appertaining wedge, tensioning means and slide shoe in the proper position in the radial direction. Further, the cover plate also maintains the slide shoe in the axial direction relative to the retaining element.

In addition, the rotary drum may comprise guide blocks which are mounted evenly distributed over the circumference of the live-ring at both sides hereof and being fixed to the drum shell to maintain the latter in axial direction through abutment against the sides of the live-ring. The guide blocks are preferably welded to the drum shell in the spaces between the bracket pairs.

BRIEF DESCRIPTION OF THE DRAWING

The invention will now be described in further details with reference to the accompanying drawing, being diagrammatical, and where.

DESCRIPTION OF THE PREFERRED EMBODIMENTS

Figure 1:
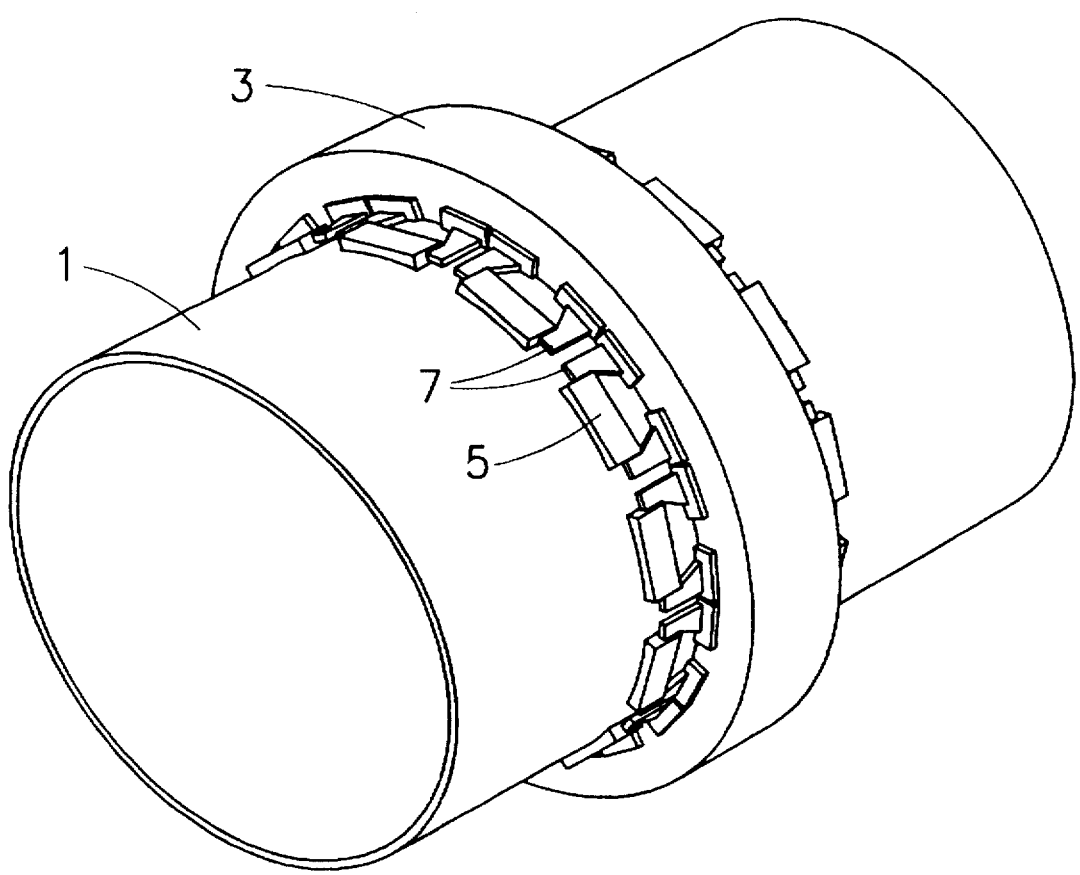
FIG. 1 shows a perspective view of a section of a rotary drum according to the invention suspended within a live-ring.

In FIG. 1 is shown a rotary drum 1 which is suspended within a live-ring 3 by means of retaining elements 5 attached to the drum, said elements being supported by brackets 7 which are fixed to the side faces of the live-ring 3. The internal as well as external surface of the live-ring 3 is smooth and cylindrical.

Figure 3:
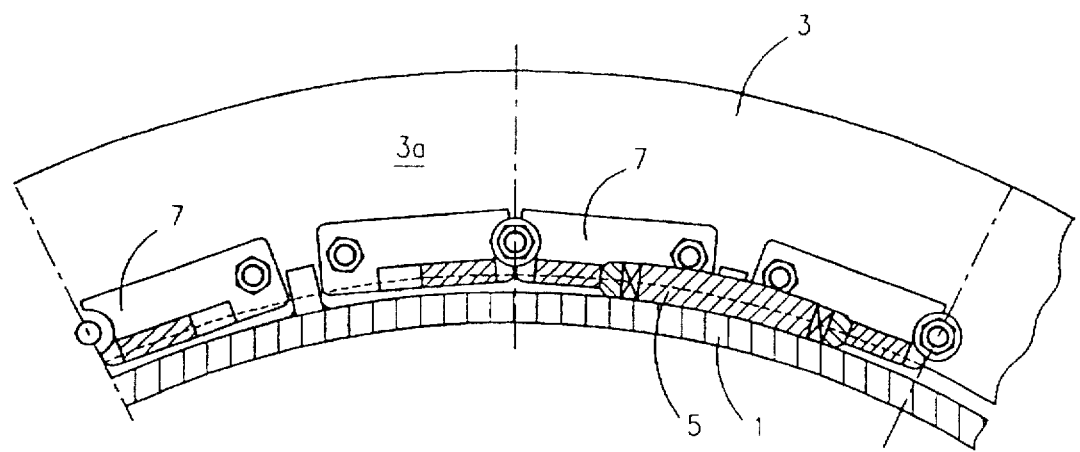
FIG. 3 shows a radial section along the line A—A through the rotary drum shown in FIG. 2.
Figure 2:
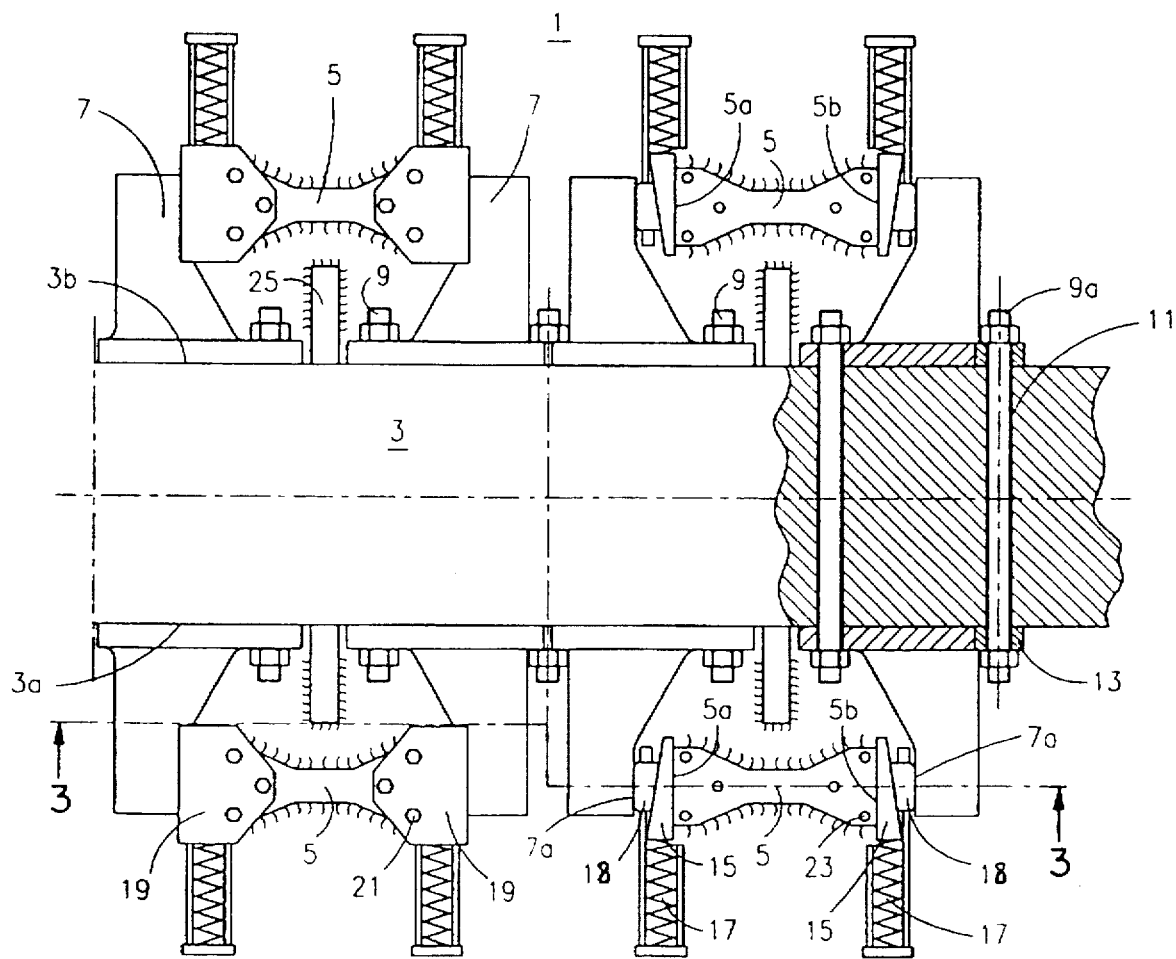
FIG. 2 shows a partial sectional view of details at the rotary drum shown in FIG. 1.

As is best illustrated in FIG. 2 and 3, the brackets 7 are retained against the side faces 3a and 3b of the live-ring 3 by means of bolts 9, which as shown at right in FIG. 2 may be through-going bolts 9 which, via holes 11 in the live-ring, retain brackets 7 on both sides of the live-ring 3. The brackets 7 are arranged in pairs on both sides of the live-ring 3, and in this way a total number of four brackets 7 can be retained by means of three through-going bolts 9. The centremost bolt 9a of these bolts 9 carries on each side of the live-ring 3 a bushing 13, the function of which is to retain the brackets in the direction of periphery.

The retaining elements 5 are fixed, preferably by welding, on both sides of the live-ring 3, and the number of these retaining elements 5 correspond to the number of bracket pairs. The free ends of a bracket pair protrude in between the end faces 5a and 5b, respectively, of two adjoining retaining elements 5.

Positioned up against the functional face 7a of each bracket 7 is a loosely fitted slide shoe 18. Further, in the space between the end faces 5a, 5b of the retaining elements 5 and the respective slide shoe 18 is fitted a wear-compensating wedge 15 which by means of a spring arrangement 17 is tensioned in direction towards the live-ring 3 so that the wedge 15 is driven slowly into the space, hence compensating for the wear which is inevitably incurred on the face of the slide shoe 18 which is pointing towards the respective bracket 7.

To keep the spring arrangement 17, the wedge 15 and the slide shoe 18 properly positioned, there is, as shown at left in FIG. 2, cover plates 19 which are mounted on the top of each retaining element 5. These cover plates 19 are preferably fixed by means of bolts 21 which are screwed into threaded holes 23 provided in the retaining elements 5.

In order keep the rotary drum 1 and the live-ring 3 in the correct mutual axial position, the rotary drum is provided with preferably welded-on guide blocks 25 which bear against the side faces of the live-ring in the spaces between adjoining pairs of brackets.

When the rotary drum 1 is mounted in the live-ring 3, as shown on the drawing, the gravitational force of the rotary drum will be transmitted via the retaining elements 5, the wedges 15 and the slide shoes 18 to the brackets 7, thus being absorbed by the live-ring 3, which in turn is carried by a not shown means of support which is normally fixed to a foundation.

Since the contact faces between the slide shoes 18 and the brackets 7 are lying in a radial plane relative to the centre axis of the rotary drum 1, the gravitational force of the rotary drum will be transmitted only in a direction which is tangential to the shell of the rotary drum 1.

The brackets 7 have a certain degree of flexibility both in the tangential and radial direction, thereby optimizing the load distribution between the single brackets 7.

When the rotary drum 1 is operating, minor relative movements between the drum shell 1 and the live-ring 3 will occur due to temperature variations and varying degrees of ovality. These movements will occur between the slide shoes 18 and the functional faces 7a of the brackets 7. Proper material selection for these structural elements will ensure that the wear is being induced on the slide shoes 18 which are relatively easy to replace.

I claim:

1. A rotary drum having an outer shell suspended substantially concentric within a live-ring by axially extending bracket means for contacting and interacting with retaining element means fixed to the outer shell of the dram, said bracket means being fixed to each of side faces of the live-ring and being evenly distributed around the circumference of the five-ring, said retaining element means being fixed to the shell of the dram and being axially displaced from and positioned on both sides of the live-ring evenly around the ring, such that the live-ring has a substantially smooth cylindrical inner face and wherein free faces of the bracket means are retained against faces of the retaining element means in such a way that the vertical load of the drum relative to the drum shell is transmitted tangentially to the five-ring.

2. A rotary drum according to claim 1, wherein the brackets are fixed to the side faces of the live-ring by means of bolts.

3. A rotary drum according to claim 2, wherein the bolts via through-going holes in the live-ring retain brackets on both sides of the live-ring.

4. A rotary dram according to claim 2, wherein the retaining elements and the bracket means are positioned and arranged such that there are a corresponding number of bracket means pairs and retaining elements means.

5. A rotary drum according to claim 4, wherein the bracket means have free ends and wherein the retaining element means have end faces, and wherein the free ends of the bracket means in a pair engage between the end faces of two adjoining retaining element means.

6. A rotary drum according to any one of claims 2–4, or 1 further comprising slide shoes, each of which being loosely fitted in a space between a functional surface of a bracket end and the corresponding end face on a retaining element.

7. A rotary drum according to claim 6, further comprising wear-compensating wedges, each of which being fitted in a space between a slide shoe and a corresponding end face on a retaining element.

8. A rotary drum according to claim 7, further comprising tensioning means, such as springs for tensioning of the wedges in place in said space.

9. A rotary drum according to claim 8, further comprising cover plates, each of which being mounted on the top surface of a retaining element, preferably by means of bolts, and which keep appertaining wedge, tensioning means and slide shoe properly positioned in the radial direction, and which prevent the slide shoes from being displaced in axial direction.

10. A rotary drum according to claim 1, further comprising guide blocks mounted evenly distributed over the circumference of the live-ring at both sides thereof and being fixed to the shell of the drum to maintain the drum in axial direction through abutment against the sides of the live-ring.

\* \* \* \* \*